US005984988A

United States Patent [19]
Berg et al.

[11] Patent Number: 5,984,988
[45] Date of Patent: Nov. 16, 1999

[54] SHAPED ABRASIVE PARTICLES AND METHOD OF MAKING SAME

[75] Inventors: Todd A. Berg, St. Louis Park; Donley D. Rowenhorst, Maplewood; James G. Berg, Lino Lakes, all of Minn.; William K. Leonard, River Falls, Wis.

[73] Assignee: Minnesota Minning & Manufacturing Company, St. Paul, Minn.

[21] Appl. No.: 09/061,262

[22] Filed: Apr. 17, 1998

Related U.S. Application Data

[63] Continuation of application No. 07/918,360, Jul. 23, 1992, abandoned.

[51] Int. Cl.$^6$ .................................................. C09C 1/68
[52] U.S. Cl. .................................. 51/293; 51/309; 264/6; 264/7
[58] Field of Search .................. 51/293, 309; 264/6, 264/7

[56] References Cited

U.S. PATENT DOCUMENTS

| | | | |
|---|---|---|---|
| 1,910,444 | 5/1933 | Nicholson . | |
| 2,688,769 | 3/1954 | Corbett . | |
| 3,041,156 | 6/1962 | Rowse et al. | 51/298 |
| 3,063,095 | 11/1962 | Limbach . | |
| 3,079,242 | 2/1963 | Glasgow | 48/192 |
| 3,079,243 | 2/1963 | Ueltz | 51/298 |
| 3,217,358 | 11/1965 | Kihara . | |
| 3,377,660 | 4/1968 | Marshall et al. | 18/26 |
| 3,387,957 | 6/1968 | Howard | 51/298 |
| 3,454,385 | 7/1969 | Amero | 51/298 |
| 3,480,395 | 11/1969 | McMullen et al. | 23/208 |
| 3,491,491 | 1/1970 | Ueltz | 51/309 |
| 3,491,492 | 1/1970 | Ueltz . | |
| 3,615,308 | 10/1971 | Amero | 51/309 |
| 3,637,360 | 1/1972 | Ueltz et al. | 51/309 |
| 3,700,525 | 10/1972 | Violette et al. . | |
| 3,859,407 | 1/1975 | Blanding et al. | 264/62 |
| 3,909,991 | 10/1975 | Coes, Jr. | 51/309 |
| 3,940,276 | 2/1976 | Wilson | 106/62 |
| 3,977,132 | 8/1976 | Sekigawa . | |
| 4,073,096 | 2/1978 | Ueltz et al. | 51/309 |
| 4,167,292 | 9/1979 | Eller | 299/7 |
| 4,194,887 | 3/1980 | Ueltz et al. | 51/309 |
| 4,252,544 | 2/1981 | Takahashi | 51/309 |
| 4,314,827 | 2/1982 | Leitheiser et al. | 51/298 |
| 4,480,045 | 10/1984 | Gougouyan et al. | 501/153 |
| 4,519,244 | 5/1985 | Meloy | 73/432 |
| 4,534,773 | 8/1985 | Phaal et al. | 51/293 |
| 4,744,802 | 5/1988 | Schwabel | 51/309 |
| 4,770,671 | 9/1988 | Monroe et al. | 51/293 |
| 4,786,292 | 11/1988 | Janz et al. | 51/293 |
| 4,793,828 | 12/1988 | Burnand | 51/293 |
| 4,799,939 | 1/1989 | Bleocher et al. | 51/293 |
| 4,832,706 | 5/1989 | Yates | 51/293 |
| 4,848,041 | 7/1989 | Kruschke | 51/309 |
| 4,881,951 | 11/1989 | Wood et al. | 51/309 |
| 4,964,883 | 10/1990 | Morris et al. | 51/293 |
| 4,997,461 | 3/1991 | Markhoff-Matheny et al. | 51/293 |
| 5,009,673 | 4/1991 | Cho | 51/293 |
| 5,009,675 | 4/1991 | Kunz et al. | 51/295 |
| 5,009,676 | 4/1991 | Rue et al. | 51/309 |
| 5,011,508 | 4/1991 | Wald et al. | 51/293 |
| 5,011,510 | 4/1991 | Hayakawa et al. | 51/293 |
| 5,021,376 | 6/1991 | Niemburg et al. | 501/153 |
| 5,030,250 | 7/1991 | Burnand et al. | 51/293 |
| 5,035,723 | 7/1991 | Kalinowski et al. | 51/309 |
| 5,035,724 | 7/1991 | Pukari et al. | 51/309 |
| 5,042,991 | 8/1991 | Kunz et al. | 51/295 |
| 5,078,753 | 1/1992 | Broberg et al. | 51/298 |
| 5,085,671 | 2/1992 | Martin et al. | 51/293 |
| 5,090,968 | 2/1992 | Pellow | 51/293 |
| 5,103,598 | 4/1992 | Kelly | 51/295 |
| 5,129,919 | 7/1992 | Kalinowski et al. | 51/309 |
| 5,201,916 | 4/1993 | Berg et al. | 51/309 |

FOREIGN PATENT DOCUMENTS

| | | |
|---|---|---|
| 0 084 986 | 1/1983 | European Pat. Off. . |
| 0 293 163 | 11/1988 | European Pat. Off. . |
| 0 325 127 | 1/1989 | European Pat. Off. . |
| 0 395 087 | 10/1990 | European Pat. Off. . |
| 0 395 088 | 10/1990 | European Pat. Off. . |
| 0 395 091 | 10/1990 | European Pat. Off. . |
| 1248798 | 11/1960 | France . |
| 2354373 | 6/1977 | France . |
| 713403 | 11/1941 | Germany . |
| 1194125 | 6/1960 | Germany . |
| 2310325 | 10/1973 | Germany . |
| 4159386 | 6/1992 | Japan . |
| 4159387 | 6/1992 | Japan . |

*Primary Examiner*—Deborah Jones
*Attorney, Agent, or Firm*—Paul W. Busse

[57] ABSTRACT

A method of making abrasive particles having a specified shape and abrasive articles containing abrasive particles having a specified shape. The method for preparing such an abrasive particle comprises the steps of: (a) providing a dispersion containing particles of a precursor of alpha alumina, preferably particles of alpha alumina monohydrate, in a liquid, which liquid comprises a volatile component; (b) providing a mold having a first surface and a second surface opposed to said first surface, said first surface having an opening to a mold cavity having a specified shape; (c) introducing the dispersion into said mold cavity; (d) removing a sufficient portion of the volatile component of the liquid from the dispersion while the dispersion is in the mold cavity, to form a precursor of an abrasive particle having approximately the same shape as the shape of the recess of the mold cavity; (e) removing the precursor of the abrasive particle from the recess of the mold; (f) calcining the removed precursor of the abrasive particle; and (g) sintering the calcined precursor to form the desired abrasive particle.

19 Claims, 6 Drawing Sheets

SHAPED ABRASIVE PARTICLES AND METHOD OF MAKING SAME

This application is a continuation of application Ser. No. 07/918,360, filed on Jul. 23, 1992, now abandoned.

BACKGROUND OF THE INVENTION

1. Field of the Invention

This invention relates to abrasive particles, and, more particularly, a method of making abrasive particles having specified shapes.

2. Discussion of the Art

Three basic technologies that have been employed to produce abrasive grains having a specified shape are (1) fusion, (2) sintering, and (3) chemical ceramic.

In the fusion process, abrasive grains can be shaped by a chill roll, the face of which may or may not be engraved, a mold into which molten material is poured, or a heat sink material immersed in an aluminum oxide melt. U.S. Pat. No. 3,377,660 discloses a process comprising the steps of flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor, whereupon the partially fractured strip is deposited onto a collector in the form of large fragments, which, upon being rapidly cooled and solidified, break up into smaller fragments capable of being reduced in size to form conventional abrasive grains. U.S. Pat. Nos. 4,073,096 and 4,194,887 disclose a process comprising the steps of (1) fusing an abrasive mix in an electric arc furnace, (2) dipping a relatively cold substrate into the molten material, whereby a layer of solid abrasive material is quickly frozen (or plated) on the substrate, (3) withdrawing the plated substrate from the molten material, and (4) breaking the solidified abrasive material away from the substrate and collecting it for further processing to produce abrasive grains.

In the sintering process, abrasive grains can be formed from refractory powders having a particle size of up to 10 micrometers in diameter. Binders can be added to the powders along with a lubricant and a suitable solvent, e.g., water. The resulting mixtures, pastes, or slurries can be shaped into platelets or rods of various lengths and diameters. The resulting shaped grains must be fired at high temperatures, e.g., 1,400° C. to 1,800° C., at high pressures, or for long soak times, e.g., up to 10 hours. Crystal size may range from under one micrometer up to 25 micrometers. To obtain shorter residence times and/or smaller crystal size, either the pressure or temperature must be increased. U.S. Pat. No. 3,079,242 discloses a method of making abrasive grains from calcined bauxite material comprising the steps of (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size. U.S. Pat. No. 4,252,544 discloses alumina abrasive grains produced by sintering wherein the grain structure is constructed of alumina coarse crystal particles and alumina fine crystal particles located between the alumina coarse crystal particles. U.S. Pat. No. 3,491,492 discloses a process for making an aluminous abrasive grain formed from bauxite or mixtures of bauxite and Bayer process alumina wherein the comminuted aluminous material is mixed with water and ferric ammonium citrate, or with ferric ammonium citrate and citric acid, and reduced to a state of fine subdivision by milling to give a fluid slurry of high solid content, drying said slurry to coherent cakes having a thickness equal to one dimension of the final grain before sintering, breaking said cakes to grains, screening, optionally rounding said grains by air mulling, screening, sintering, cooling, and screening to yield the final product. U.S. Pat. No. 3,637,630 discloses a process in which the same type of slurry disclosed in U.S. Pat. No. 3,491,492 is plated or coated on a rotating anode of an electrophoretic cell. The plated aluminous material is removed from the rotating anode, dried, broken to granules, screened, sintered, and screened to final size.

Chemical ceramic technology involves converting a colloidal dispersion or hydrosol (sometimes called a sol), optionally in a mixture with solutions of other metal oxide precursors, to a gel or any other physical state that restrains the mobility of the components, drying, and firing to obtain a ceramic material. A sol can be prepared by any of several methods, including precipitation of a metal hydroxide from an aqueous solution followed by peptization, dialysis of anions from a solution of metal salt, solvent extraction of an anion from a solution of a metal salt, hydrothermal decomposition of a solution of a metal salt having a volatile anion. The sol optionally contains metal oxide or precursor thereof and is transformed to a semi-rigid solid state of limited mobility such as a gel by, e.g., partial extraction of the solvent, e.g., water. Chemical ceramic technology has been employed to produce ceramic materials such as fibers, films, flakes, and microspheres. U.S. Pat. No. 4,314,827 discloses synthetic, non-fused aluminum oxide based abrasive mineral having a microcrystalline structure of randomly oriented crystallites comprising a dominant continuous phase of alpha alumina and a secondary phase. U.S. Pat. No. 4,744,802 discloses an abrasive grain made by a chemical ceramic process that employs an iron oxide nucleating agent to enhance the transformation to alpha alumina. This patent also suggests that the gel can be shaped by any convenient method such as pressing, molding, or extruding. U.S. Pat. No. 4,848,041 discloses a shaped abrasive grain made by a chemical ceramic process in which the abrasive grain has a mean particle volume ratio of less than 0.8.

SUMMARY OF THE INVENTION

This invention provides a method of making abrasive particles having specified shapes. This invention also provides abrasive particles having specified shapes.

The method for preparing such an abrasive particle comprises the steps of:

(a) providing a dispersion comprising particles that can be converted into alpha alumina, preferably particles of alpha alumina monohydrate, in a liquid, which liquid comprises a volatile component;

(b) providing a mold having a first surface having an opening to a mold cavity having a specified shape;

(c) introducing the dispersion into said mold cavity;

(d) removing a sufficient portion of said volatile component of said liquid from the dispersion while the dispersion is in the mold cavity, thereby forming a precursor of an abrasive particle having a shape approximately corresponding to the shape of said mold cavity;

(e) removing said precursor of the abrasive particle from said mold cavity;

(f) calcining said removed precursor of the abrasive particle; and (g) sintering said calcined precursor to form the desired abrasive particle.

In one variation of the process of this invention, after the dispersion is formed, it is gelled prior to being introduced into the mold cavity. As used herein, the term "to gel" means to increase the viscosity of a substance sufficiently so that it will not flow from an inverted test tube. In a second variation, the dispersion is introduced into the mold cavity under a pressure of less than 100 psi. In a third variation, at least one side of the mold, i.e. the side in which the cavity is formed, is exposed to the atmosphere surrounding the mold during the step in which the volatile component is removed. In a fourth variation, the volatile component of the dispersion is removed from the dispersion while the dispersion is in the mold without the application of additional heat or pressure. In a fifth variation, the volatile component of the dispersion is removed from the dispersion by evaporation while the dispersion is in the mold. In a sixth variation, an additional drying step is utilized after the precursor of the abrasive particle is removed from the mold.

Preferably, the mold contains a plurality of cavities, more preferably at least twenty cavities. Preferably, the shape of the cavities correspond approximately to the desired shape of the abrasive particles.

A second aspect of the invention involves abrasive particles having specified shapes. In particular, the abrasive particles have shapes that can be characterized as thin bodies having triangular, rectangular, including square, circular, or other geometric shape. The abrasive particles have a front face and a back face, both of which faces have substantially the same geometric shape. The faces are separated by the thickness of the particle. The ratio of the length of the shortest facial dimension of an abrasive particle to its thickness is at least 1 to 1, preferably at least 2 to 1, more preferably at least 5 to 1, and most preferably at least 6 to 1.

The use of the abrasive particles of this invention minimizes the formation of flat surfaces on the cutting regions of the abrasive material. These flat surfaces shorten the useful life of conventional abrasive articles. During the abrading process, the shaped particles of this invention continually fracture to expose fresh cutting surfaces. Accordingly, they sharpen themselves during use.

The abrasive particles of this invention can be used in coated abrasive articles, bonded abrasive articles, non-woven abrasive articles, and abrasive brushes. At least 10% by weight, and preferably to 100% by weight, of the abrasive material of the abrasive article should be of the abrasive particles of this invention.

The particles prepared by the process of this invention can be used to prepare a coated abrasive article. The coated abrasive article comprises a backing having at least one layer of abrasive grits adhered thereto by means of a binder. A portion of this layer contains abrasive particles of this invention. It is preferred that the geometric shape of the faces of these abrasive particles be triangular. In order to efficiently align the abrasive particles of this invention on the backing, the abrasive particles are preferably coated in an electrostatic field. The electrostatic field lines concentrate at the corners and along the edges of the abrasive particles, and by means of mutual particle repulsion, the particles orient in the electrostatic field in such a way that they are deposited onto the binder on their thinnest edges, thereby allowing thin edges of the particles to be in contact with the workpiece during abrading operations. For triangular-shaped particles, about 35% to about 65% of the particles are oriented with a vertex pointing away from the backing and a base in contact with the binder, with the remainder being oriented with a base pointing away from the backing and a vertex in contact with the binder. It is believed that when this configuration is used with equilateral triangular-shaped particles, the sum of the surface areas of each of the particles in contact with the workpiece remains essentially constant during use, even though the surface area of each individual abrasive particle in contact with the workpiece varies during use.

DETAILED DESCRIPTION

As used herein, the term "dispersion" means the composition that is introduced into the mold cavity—the composition will be referred to as a dispersion until sufficient volatile component is removed therefrom to bring about solidification of the dispersion; the term "precursor of abrasive particle" means the unsintered particle produced by removing a sufficient amount of the volatile component from the dispersion, when it is in the mold cavity, to form a solidified body having a shape corresponding approximately to the shape of the mold cavity; the term "abrasive particle" means the sintered particle produced by the process of this invention.

The first step of the process of this invention involves preparing a dispersion containing particles that can be converted into alpha alumina in a liquid, which liquid comprises a volatile component, preferably water. The dispersion should comprise a sufficient amount of liquid to cause the viscosity of the dispersion to be sufficiently low to ensure ease of introduction into the mold cavity but not so much liquid as to cause subsequent removal of the liquid from the mold cavity to be prohibitively expensive. The dispersion preferably comprises from about 2 to about 90% by weight of the particles that can be converted into alpha alumina, preferably particles of alpha aluminum oxide monohydrate (boehmite), and at least 10% by weight, preferably from 50 to 70%, more preferably 50 to 60%, by weight, volatile component, preferably water. Conversely, the dispersion preferably contains from 30 to 50%, more preferably 40 to 50% by weight, solids. If the percentage of liquid is too high, too many cracks will develop in the resulting particles upon drying thereof. If the percentage of liquid is too low, pumping of the dispersion will be difficult. Aluminum oxide hydrates other than boehmite can also be used. Boehmite can be prepared by known techniques or can be obtained commercially. Examples of commercially available boehmite include products having the trademarks "DISPERAL", available from Condea Chemie, GMBH and "DISPAL", available from Vista Chemical Company. These aluminum oxide monohydrates are in the alpha form, are relatively pure, i.e., they include relatively little, if any, hydrate phases other than monohydrates, and have a high surface area. The physical properties of the abrasive particles of this invention will generally depend upon the type of material used in the dispersion.

It is preferred that the dispersion be in a gel state. As used herein, "a gel" is a three dimensional network of solids dispersed in a liquid. A gel will not flow from an inverted test tube.

The dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the dispersion is not critical and can be varied on the basis of convenience. Typically, the introduction of a modifying additive or precursor of a modifying additive will cause the dispersion to gel. The dispersion can also be induced to gel by application of heat over a period of time.

The dispersion can also contain a nucleating agent to enhance the transformation of hydrated or calcined aluminum oxide to alpha alumina. Nucleating agents suitable for this invention include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such dispersions is disclosed in U.S. Pat. No. 4,744,802, incorporated hereinafter by reference.

A peptizing agent can be added to the dispersion to produce a more stable hydrosol or colloidal dispersion. Peptizing agents preferred for this invention are monoprotic acids or acid compounds such as acetic acid, hydrochloric acid, formic acid, and nitric acid, with nitric acid being preferred. Multiprotic acids are less preferred as peptizing agents because they rapidly gel the dispersion, making it difficult to handle or to introduce additional components thereto. Some commercial sources of boehmite contain an acid titer (such as absorbed formic or nitric acid) that will assist in forming a stable dispersion.

The dispersion can be formed by any suitable means, such as, for example, simply by mixing aluminum oxide monohydrate with water containing a peptizing agent or by forming an aluminum oxide monohydrate slurry to which the peptizing agent is added.

Figure 1:
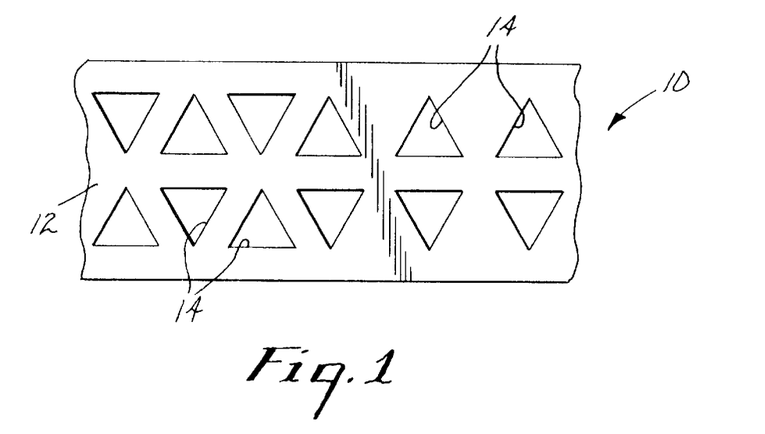
FIG. 1 is a top view of a mold suitable for the process of this invention.

The second step of the process of this invention involves providing a mold having at least one cavity, preferably a plurality of cavities. Referring to FIG. 1, a mold 10 has a surface 12 and a plurality of cavities 14.

Figure 2:
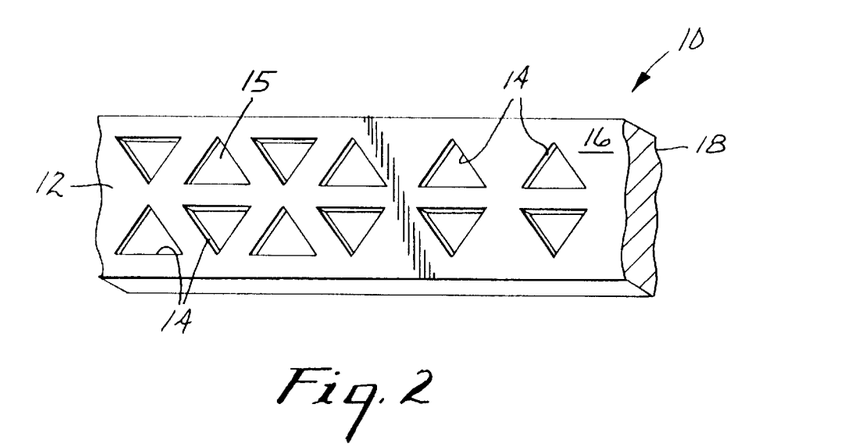
FIG. 2 is a perspective view of a mold suitable for the process of this invention.

Mold 10 can be made from a rigid material, such as metal, e.g., steel. It is preferred that mold 10 be made from a relatively thin aluminum or stainless steel sheet or belt, e.g., having a thickness of less than 5 cm, preferably less than 2 cm. Referring to FIG. 2, access to cavities 14 of mold 10 can be from an opening 15 in first or top surface 16 of mold 10, from an opening (not shown) in second or bottom surface 18 of mold 10, or from openings in both surfaces of mold 10. In some instances, cavities 14 can extend for the entire thickness of mold 10. Alternatively, cavities 14 can extend only for a portion of the thickness of mold 10. At least one side of mold 10, i.e. the side in which the cavity is formed, can remain exposed to the surrounding atmosphere during the step in which the volatile component is removed.

The cavities 14 have a specified three-dimensional shape. The preferred shape of a cavity can be described as being a triangle having a dimension of depth. However, other shapes can be used, such as, circles, rectangles, squares, or combinations thereof, all having a dimension of depth. The dimension of depth is equal to the perpendicular distance from the surface 12 to the lowermost point of cavity 14. In addition, a cavity can have the inverse of even other solid geometric shapes, such as, for example, pyramidal, frusto-pyramidal, truncated spherical, truncated spheroidal, conical, and frusto-conical. There are preferably at least 20 cavities per mold, more preferably at least 100 cavities per mold. The depth of the cavity can be uniform or can vary along its length and/or width. The cavities of a given mold can be of the same shape or of different shapes.

It is preferred that the dimensions of cavities 14 approximately correspond to the desired dimensions of the abrasive particles, taking expected shrinkage into account. Accordingly, it will not be necessary to crush, break, or cut the abrasive particles to reduce their size. Likewise, after the abrasive particles are made by the process of this invention, it is not necessary to screen them to an appropriate particle size. Moreover, the size of the abrasive particles will essentially remain constant between different lots, thereby assuring a very consistent particle size and distribution of particle sizes from lot to lot. By using cavities of the same size and shape, abrasive particles of substantially constant aspect ratio can be made.

The third step of the process of this invention involves introducing the dispersion into cavities 14 by any conventional technique. It is preferred to flood surface 12 of mold 10 with the dispersion. The dispersion can be pumped onto surface 12 of mold 10. Next, a scraper or leveler bar can be used to force some of the dispersion into cavities 14 of mold 10. The remaining portion of the dispersion that does not enter cavities 14 can be removed from surface 12 of mold 10 and recycled. Although a small portion of the dispersion can still be allowed to remain on surface 12 of mold 10, this is not preferred. The pressure applied by the scraper or leveler bar is typically less than 100 psi, preferably less than 50 psi, and most preferably less than 10 psi.

It is preferred that a release coating be applied to surface 12 of mold 10 and on the surfaces of cavities 14 prior to the introduction of the dispersion into cavities 14. The function of the release coating is to allow ease of removal of the precursors of the abrasive particles. Typical materials for preparing release coatings are silicones and polytetrafluoroethylene.

The fourth step of the process of this invention involves removing a portion of the liquid, i.e. the volatile component thereof, from the dispersion while the dispersion is in the mold cavity, thereby resulting in an increase in the viscosity of the dispersion. It is preferred that the volatile component be removed by evaporation rather than by an external force such as filtration. Removal of liquid by evaporation can occur at room temperature or at elevated temperatures. The elevated temperatures can range from about 40° C. to about 300° C. However, at higher temperatures, high drying rates are obtained that produce undesirable cracks in the resulting abrasive particle. It is preferred to heat the mold containing the dispersion at a temperature of from about 50° C. to about 80° C. for from about 10 to about 30 minutes in a forced air oven. A sufficient amount of the volatile component must be removed from the dispersion to bring about solidification thereof, thereby forming a precursor of an abrasive particle having approximately the same shape as the shape of the mold cavity. It is preferred that a sufficient amount of volatile component be removed from the dispersion so that the precursors of the abrasive particles can be easily removed from the cavities of the mold. Typically, up to 40% of the liquid is removed from the dispersion in this step. At this point the precursors of the abrasive particles are sufficiently nonsticky that they will not stick to one another when they are removed from the mold.

The fifth step of the process of this invention involves removing the precursors of the abrasive particle from the mold cavities. This step is made possible by shrinkage of the dispersion, when the liquid is removed therefrom. For example, it is not uncommon for the dispersion to shrink 20% or more. The precursors of the abrasive particles can be removed from the mold cavities either by gravity or by applying a low pressure to force them out of the cavities.

The removed precursors of the abrasive particles have approximately the same shape as the cavities of the mold from which they were formed. Exact replication is unlikely for three reasons. First, the dispersion will shrink, so the precursors of the abrasive particles will be smaller. Second, when the precursors of the abrasive particles are removed from the mold cavities, some of their edges may break off or become rounded. Third, when the dispersion is introduced in the cavities, the dispersion may not completely fill the cavities. It should be noted that care should be taken throughout the process to minimize the foregoing factors.

The precursors of the abrasive particles can be further dried outside of the mold. If the dispersion is dried to the desired level in the mold, this additional drying step is not necessary. However, in some instances it may be economical to employ this additional drying step to minimize the time that the dispersion resides in the mold. During this additional drying step, care must be taken to prevent cracks from forming in the precursors of the abrasive particles. Typically, the precursors of the abrasive particles will be dried for from about 10 to about 480 minutes, preferably from about 120 to about 400 minutes, at a temperature from about 50° C. to about 160° C., preferably from about 120° C. to about 150° C.

The sixth step of the process of this invention involves calcining the precursors of the abrasive particles. During calcining, essentially all the volatile material is removed, and the various components that were present in the dispersion are transformed into metal oxides. The precursors of the abrasive particle are generally heated to a temperature of from about 400° C. to about 800° C., and maintained within this temperature range until the free water and over 90% by weight of any bound volatile material are removed. In an optional step, it may be desired to introduce the modifying additive by an impregnation process. A water-soluble salt can be introduced by impregnation into the pores of the calcined precursors of the abrasive particles. Then the precursors of the abrasive particles are prefired again. This option is further described in European Patent Application No. 293,163, incorporated herein by reference.

The seventh step of the process of this invention involves sintering the precursors of the abrasive particles to form the abrasive particles. Prior to sintering, the precursors of the abrasive particles are not completely densified and thus lack the hardness to be used as abrasive particles of this invention. Sintering takes place by heating the precursors of the abrasive particle to a temperature of from about 1,000° C. to about 1,650° C. and maintaining them within this temperature range until substantially all of the alpha alumina monohydrate (or equivalent) is converted to alumina and porosity is reduced to less than 15% by volume. The length of time to which the precursors of the abrasive particles must be exposed to the sintering temperature to achieve this level of conversion depends upon various factors but usually from about five seconds to about 48 hours is typical. The preferred duration for sintering ranges from about one minute to about 90 minutes.

Other steps can be used to modify the process of this invention, such as rapidly heating the material from the calcining temperature to the sintering temperature, centrifuging the dispersion to remove sludge, waste, etc. Moreover, this process can be modified by combining two or more of the process steps, if desired. Conventional process steps that can be used to modify the process of this invention are more fully described in U.S. Pat. No. 4,314,827, incorporated herein by reference.

Figure 8:
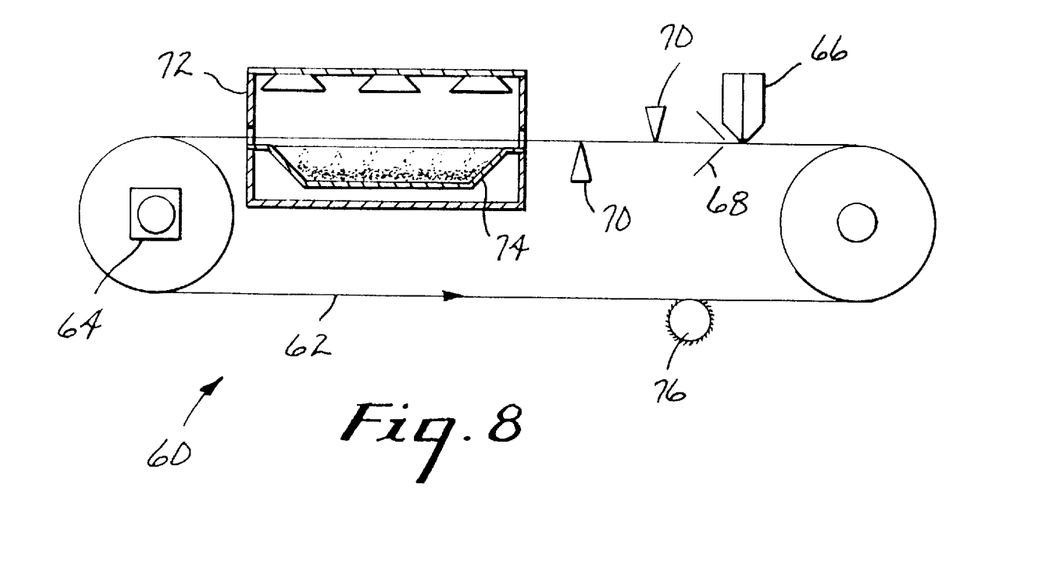
FIG. 8 is a side view of an apparatus for preparing abrasive particles of this invention.
Figure 9:
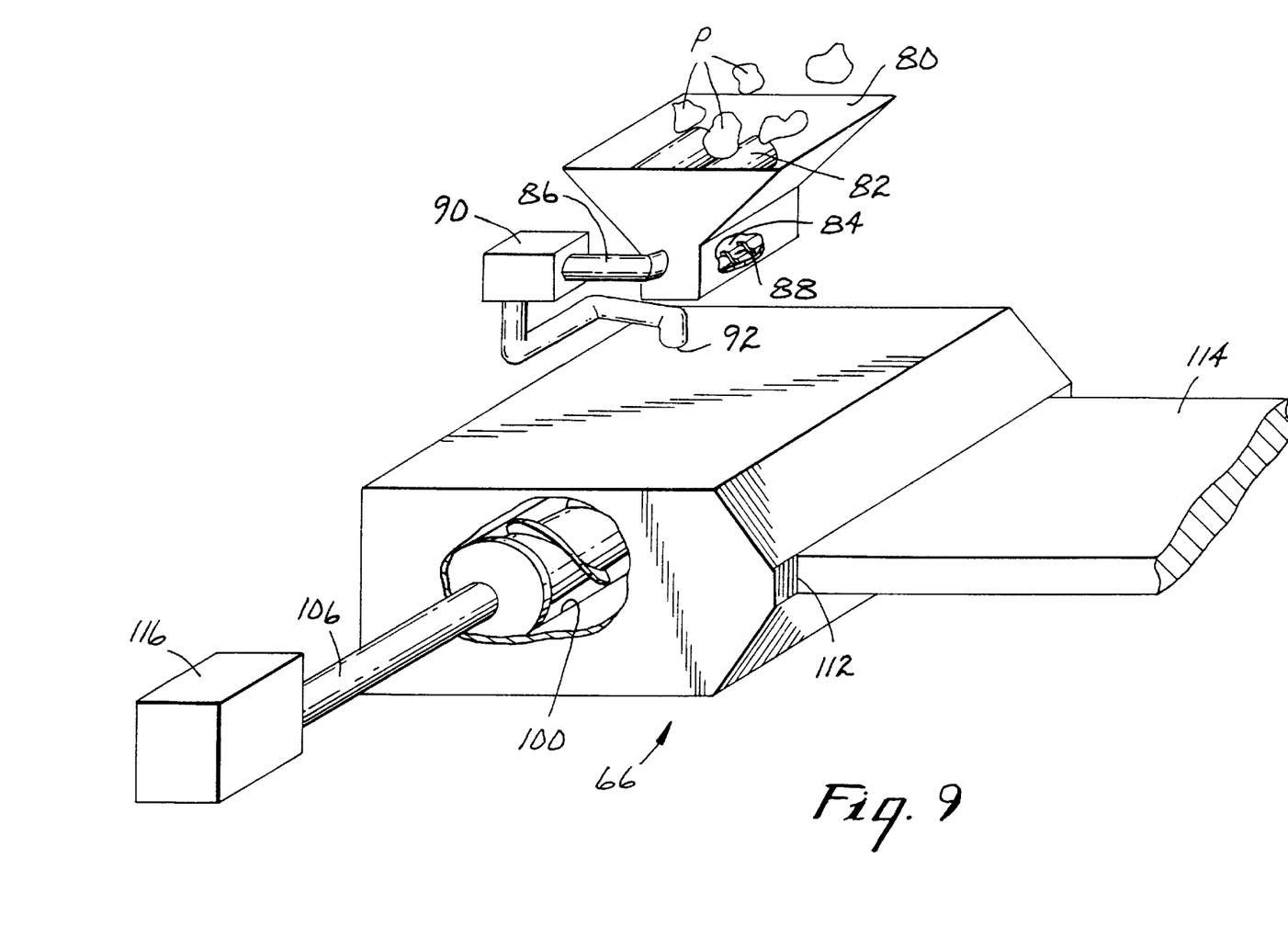
FIG. 9 is a schematic perspective view of a die that can be used in the apparatus of FIG. 8.
Figure 10:
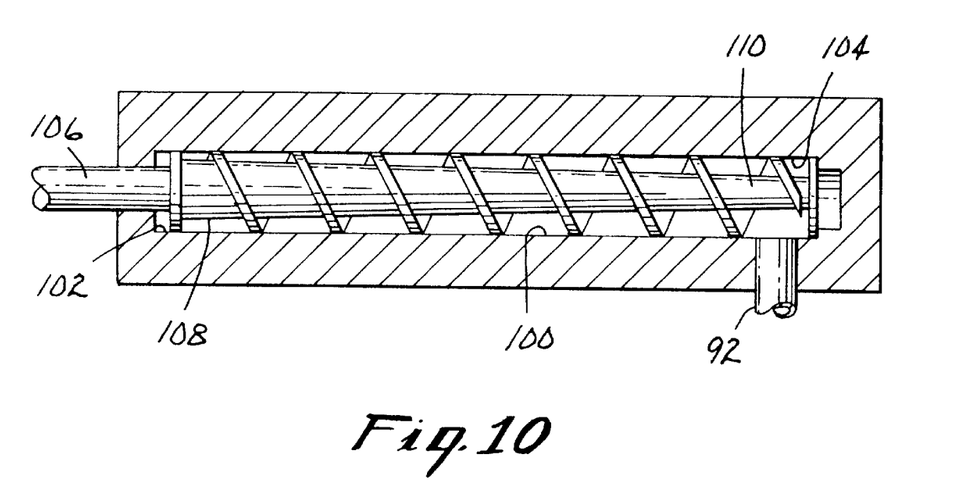
FIG. 10 is a sectional view of the auger and bore of the die body of FIG. 9.

As shown in FIG. 8, a continuous process can be used to make the abrasive particles of this invention. The apparatus 60 in FIG. 8 comprises a mold 62, a driving mechanism 64, a die body 66, leading-edge wiper blades 68, levelling doctor blades 70, an oven 72, a collecting pan 74, and a brush 76. Referring now to FIG. 9, an extrudable dispersion containing particles "P" of a material that can be converted into alpha alumina (hereinafter "convertible material") in a liquid is provided to a supply means 80 for delivery to die body 66. Typical supply means can comprise a combination kneader and extruder 82, which includes twin, counter-rotating mixing blades that mix and pack the convertible material into an auger channel 84 for delivery through exit port 86 by a supply auger 88. Mixing and packing the convertible material aids in preventing voids that may produce a nonuniform sheet. The exit port 86 is connected to a pump 90, which pressurizes the convertible material and supplies it to a feed port 92 of die body 66.

Die body 66 includes a longitudinal bore 100 therein having first and second ends 102 and 104, respectively. Feed port 92 communicates the exterior of die body 66 with bore 80 adjacent second end 104. An auger 106 having first and second ends 108 and 110, respectively, is disposed within bore 100. Auger 106 comprises a longitudinal root and a helical flight adjoining the root along the length thereof. The flight diameter of auger 106 is constant, and the root has a first diameter at the first end 108, and a second diameter smaller than the first diameter at the second end 110. The flight depth of auger 106 is therefore greatest near feed port 92, and gradually decreases toward the first end 108 of auger 106, although the overall flight diameter is constant. The material conveying capacity of auger 106 thus gradually decreases along the length of the auger due to the gradually decreasing flight depth.

Die body 66 includes one or more elongate die openings 112 that communicate the exterior of die body 66 with bore 100 along the length of auger 106. In the preferred embodiment, die body 66 includes a single elongate die opening 112 that is adapted to form a uniform sheet member having a width substantially in excess of its thickness. The combination of the position of die opening 112 relative to auger 106 and the configuration of auger 106 tends to produce a uniform extruded sheet 114 of convertible material.

A motor 116 rotates auger 106 within bore 100 to extrude the convertible material in sheet form. The proper rotational speed of auger 106 may be experimentally or analytically determined to provide the desired uniform rate of extrusion. If auger 106 is rotated too slowly, excess convertible material may be discharged through the portion of die opening 112 nearest second end 104. Similarly, if auger 106 is rotated too quickly, excess convertible material may be discharged through the portion of die opening 112 nearest first end 102. At the proper rotational velocity, the pressure along bore 100 is uniform, thereby forcing a sheet of uniform thickness through die opening 112.

The dispersion is forced into cavities (not shown) of the mold 62 as it passes through the die opening 112. The die opening 112 is in close registry with mold 62. The distance between the die opening 112 and the mold 62 is preferably about 0.2 inch (0.51 cm). The mold 62 of FIG. 8 is a flexible belt, which is driven by the driving mechanism 64. It is preferred to run the belt at a fixed rate. The cavities in the mold 62 can have any desired geometric shape, such as triangular, circular, or square. The cavities can be formed by conventional means, such as by machining, punching, or etching. The cavities can extend completely through the belt, such that the belt has a multiplicity of perforations therein. The flexible belt 62 can be made of any material that will withstand the operating conditions of the process. A belt made of metal such as stainless steel or aluminum is preferable. It is preferred that the mold 62 be coated with a release coating, such as polytetrafluoroethylene, to improve the release of the dried precursor particles from the cavities of the mold 62.

It is preferred that the exposed surface or surfaces of the dispersion in the cavities not extend substantially beyond the plane of the belt in order to guarantee that the abrasive particles prepared from the process be substantially uniform. Any excess dispersion surrounding the openings of the cavities and remaining on the non-recessed portion of the belt 62 is removed, preferably by leading-edge wiper blades 68 positioned down the belt 62 from the die body 66. The top and bottom surfaces of the belt 62 can be wiped by the leading-edge wiper blades 68. These blades 68 are mounted between leveling doctor blades 70 and the die body 66. The leveling doctor blades 70 further ensure that abrasive precursor particles will have a uniform thickness.

The filled cavities in the belt 62 are moved into the oven 72, which is preferably an air circulating oven. The oven temperature is preferably set at approximately 75° C. However, the oven temperature can be higher or lower depending on the speed of the belt 62 and solids content of the dispersion. The dispersion in the mold cavity retains sufficient liquid to remain sufficiently sticky to adhere or stick to similar dispersion material if placed into contact. The dispersion is also sufficiently sticky to remain adhered to the belt. The volatile component of the liquid is removed from the dispersion in the oven 72. Care should be taken to solidify the dispersion sufficiently slowly so that the formation of cracks in the abrasive particles is minimized. As the volatile component is removed, the precursors of the abrasive particles begin to form. Because their volume is less than that of the dispersion from which they are formed, they will fall out of the cavities in the belt 62, and can be collected in a collecting pan 74. The shaped, dried precursors of the abrasive particles are then calcined and fired, preferably in a rotary kiln (not shown). Firing is preferably carried out at a temperature of 1300° C. to 1400° C. for a period of 1 to 15 minutes. Any precursor material remaining on the belt 62 or in the cavities of the belt can be removed, preferably by a rotating brush 76 or other cleaning process.

Figure 4:
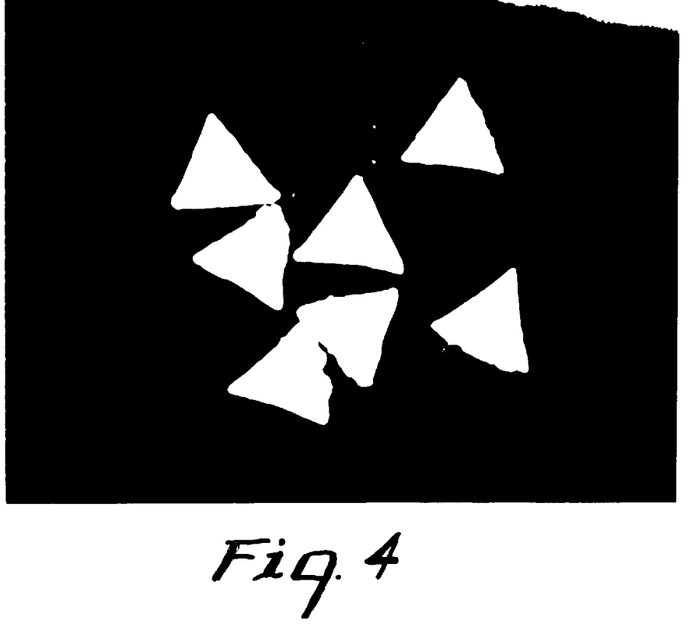
FIG. 4 is a photomicrograph taken at 12× illustrating abrasive particles of this invention in which the planar shape is triangular.
Figure 5:
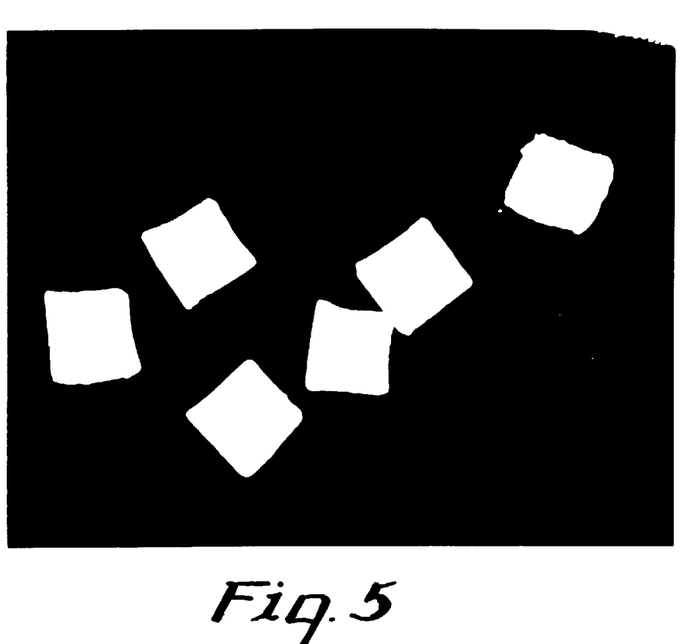
FIG. 5 is a photomicrograph taken at 12× illustrating abrasive particles of this invention in which the planar shape is rectangular.
Figure 6:
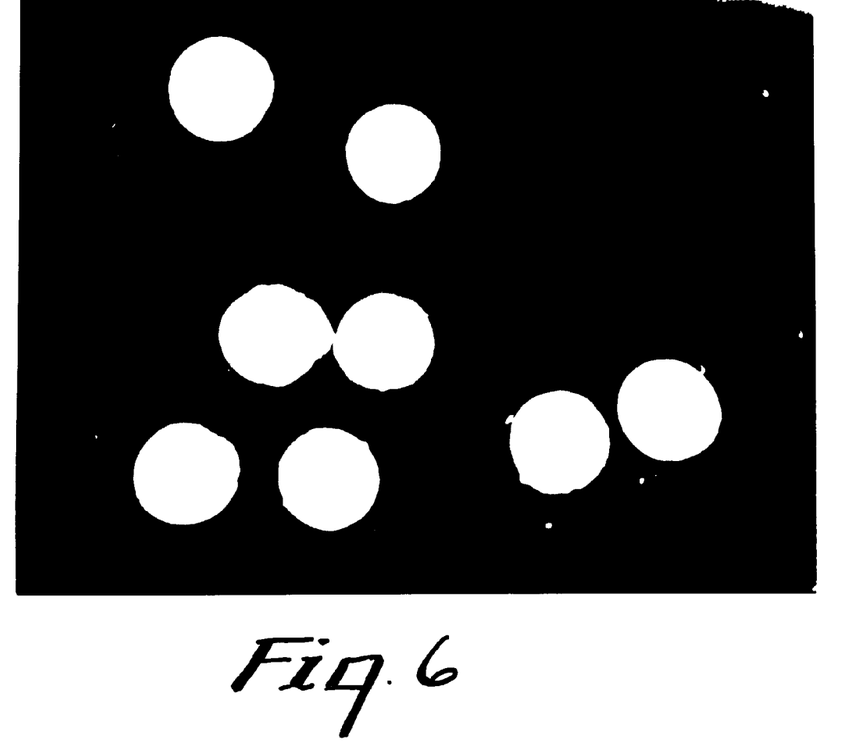
FIG. 6 is a photomicrograph taken at 12× illustrating abrasive particles of this invention in which the planar shape is circular.

The second aspect of this invention pertains to abrasive particles having specified three-dimensional shapes. In particular, abrasive particles of this invention are preferably in the shape of bodies having a front face and a back face, the front face and the back face being separated by the thickness of the particle. The front face and the back face have substantially the same geometric shape. The geometric shape can be triangular, rectangular, circular, elliptical, or that of other regular or irregular polygons. The most preferred geometric shape is triangular. For the purposes of this invention, triangular shapes also include three-sided polygons wherein one or more of the sides can be arcuate, i.e., the definition of triangular extends to spherical triangles. Of triangular shapes, that of an equilateral triangle is the most preferred. FIG. 4 illustrates a picture taken at 12× magnification of a triangular-shaped abrasive particle. FIG. 5 illustrates a picture taken at 12× magnification of a square-shaped abrasive particle. FIG. 6 illustrates a picture taken at 12× magnification of a circular-shaped abrasive particle.

In most cases, the ratio of the length of the shortest facial dimension of the abrasive particle to the thickness of the abrasive particle is at least 1 to 1, preferably at least 2 to 1, more preferably at least 5 to 1, most preferably at least 6 to 1. As used herein, the term "thickness", when applied to a particle having a thickness that varies over its planar configuration, shall mean the minimum thickness. If the particle is of substantially uniform thickness, the values of minimum, maximum, mean, and median thickness shall be substantially equal. For example, in the case of a triangle, if the thickness is equivalent to "a" the length of the shortest side of the triangle is preferably at least "2a". In the case of a particle in which two or more of the shortest facial dimensions are of equal length, the foregoing relationship continues to hold. In most cases, the abrasive particles are polygons having at least three sides, the length of each side being greater than the thickness of the particle. In the special situation of a circle, ellipse, or a polygon having very short sides, the diameter of the circle, minimum diameter of the ellipse, or the diameter of the circle that can be circumscribed about the very short-sided polygon is considered to be the shortest facial dimension of the particle. If an abrasive particle is prepared in a mold cavity having a pyramidal, conical, frusto-pyramidal, frusto-conical, truncated spherical, or a truncated spheroidal shape, the thickness is determined as follows: (1) in the case of a pyramid or cone, the thickness is the length of a line perpendicular to the base of the particle and running to the apex of the pyramid or cone; (2) in the case of a frusto-pyramid or frusto-cone, the thickness is the length of a line perpendicular to the center of the larger base of the frusto-pyramid or of the frusto-cone and running to the smaller base of the frusto-pyramid or of the frusto-cone; (3) in the case of a truncated sphere or truncated spheroid, the thickness is the length of a line perpendicular to the center of the base of the truncated sphere or truncated spheroid and running to the curved boundary of the truncated sphere or truncated spheroid. The length of the shortest facial dimension of the particle is the length of the shortest facial dimension of the base of the particle (if the particle has only one base) or the length of the shortest facial dimension of the larger base of the particle (if the particle has two bases). The thickness of the particles preferably range from about 25 micrometers to 500 micrometers. This aspect ratio provides improved performance of the abrasive particle as compared with conventional unshaped abrasive grits.

The abrasive particles of this invention can be used in coated abrasive articles, bonded abrasive articles, nonwoven abrasive articles, and abrasive brushes. The abrasive articles listed can contain up to 100% of the abrasive particles of this invention. Additionally, the abrasive articles may contain a blend of the abrasive particles of this invention along with conventional abrasive grains or diluent grains. Representative examples of materials of conventional abrasive grains include fused aluminum oxide, silicon carbide, garnet, fused alumina zirconia, cubic boron nitride, diamond, and the like. Representative examples of materials of diluent grains include marble, gypsum, and glass. However, at least 10% by weight, preferably 50 to 100% by weight, of the abrasive particles or grains of the abrasive articles of this invention should be of the type of abrasive particle of this invention. Blends of different shapes of the abrasive particles of this invention can be used in the articles containing the abrasive particles. The alumina based, ceramic abrasive particles of this invention may also have a surface coating. Surface coatings are known to improve the adhesion between abrasive grains and the binder in abrasive articles. Additionally, the surface coating may prevent the abrasive particle from capping. Capping is the term to describe the phenomenon where metal particles from the workpiece being abraded become welded to the tops of the abrasive particles. Such surface coatings are described in U.S. Pat. Nos. 5,011,508; 1,910,444; 3,041,156; 5,009,675; 5,085,671; 4,997,461; and 5,042,991, all of which are incorporated herein by reference.

Figure 3:
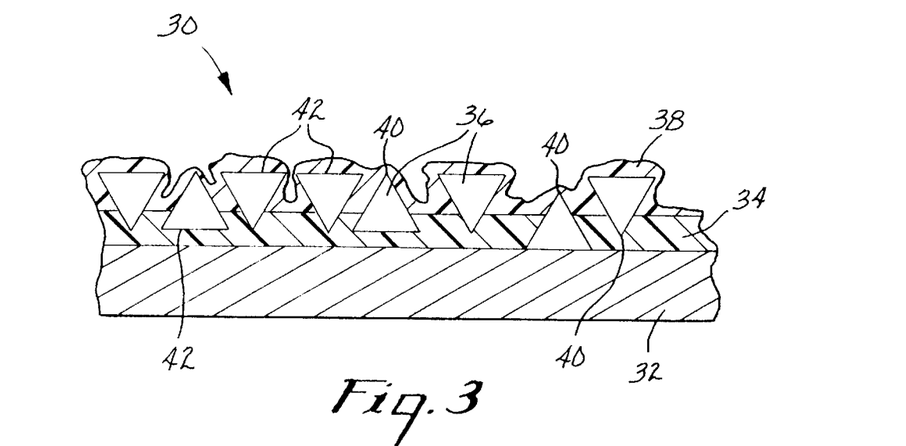
FIG. 3 is a side view of a coated abrasive article that employs the abrasive particle of this invention.

Referring to FIG. 3, coated abrasive article 30 comprises a backing 32 having a first layer of binder 34, hereinafter referred to as the make coat, applied over one major surface of backing 32. Partially embedded in make coat 34 are a plurality of abrasive particles 36. Over the abrasive particles 36 is a second layer of binder 38, hereinafter referred to as the size coat. The purpose of make coat 34 is to secure abrasive particles 36 to backing 32 and the purpose of size coat 38 is to reinforce abrasive particles 36. It is preferred that a portion of the abrasive particles have a triangular-shape. These abrasive particles will hereinafter be designated as triangular-shaped abrasive particles. Of these triangular-shaped abrasive particles, from about 35% to about 65% are oriented on the backing with a vertex 40 of the triangle pointing away from the backing as illustrated by FIG. 3. The remainder of these triangular-shaped abrasive particles are oriented with a base 42 of the triangle pointing away from the backing. However, up to 20% of the particles may not be oriented in either of the preceding ways, e.g., they may lay against the backing with the triangular face of the particle being in contact with the make coat. As used herein, the phrase "vertex pointing away from the backing" means that a base of the triangular-shaped particle is adhered to the backing via the make coat; the phrase "vertex pointing away from the backing" also includes those situations in which the line corresponding to the altitude of the triangular-shaped particle is tilted from the perpendicular at a small angle, typically less than 45°, preferably less than 30°. As used herein, the phrase "base pointing away from the backing" and the like means that a vertex of the triangular-shaped particle is adhered to the backing via the make coat; the phrase "base pointing away from the backing" includes those situations in which the line corresponding to the altitude of the triangular-shaped particle is tilted from the perpendicular at a small angle, typically less than 45°, preferably less than 30°.

During the manufacture of the coated abrasive article, the triangular-shaped abrasive particles are applied into the make coat by electrostatic coating techniques. Electrostatic coating causes a portion of the triangular-shaped abrasive particles to be oriented with a base pointing away from the backing and a portion to be oriented with a vertex pointing away from the backing. This manner of orientation results in improved performance of the coated abrasive article. Additionally, this manner of orientation results in a coated abrasive article in which the sum of the surface areas of the triangular-shaped abrasive particles in contact with the workpiece remains essentially constant during abrading, even though the surface area of any individual abrasive particle in contact with the workpiece varies during abrading.

It is to be expected that a small number of triangular-shaped abrasive particles will fail to become adhered to the backing by way of a base or a vertex and will lie flat on the make coat such that the triangular face is in contact with the binder. These particles will perform no cutting. The number of particles lying flat will increase at lower weights of abrasive mineral. During electrostatic deposition of the abrasive particles, preferred orientation of the abrasive particles is easier to maintain when the space between the particles is so small that the particles do not have sufficient room to tip over during deposition.

Preferably, throughout the abrading process, the total surface area of the layer of abrasive particles in contact with the workpiece will essentially remain constant. However, during abrading, the surface area of the individual abrasive particles in contact with the workpiece will vary. This effect can be achieved in the case in which about 35% to about 65% of the abrasive particles have their vertices pointing away from the backing and about 35% to about 65% of the abrasive particles have their bases pointing away from the backing. The cut and surface finish of the workpiece will remain essentially consistent throughout the useful life of the abrasive article.

Figure 7:
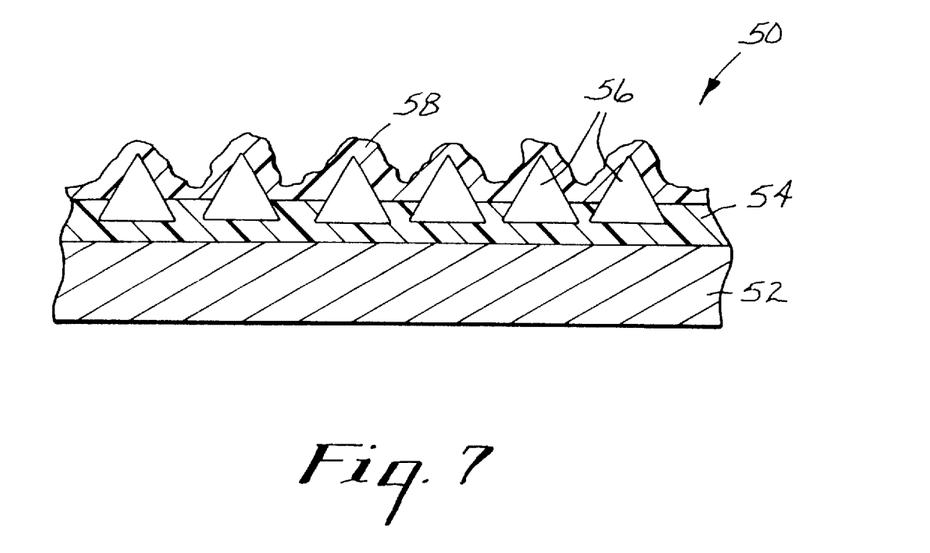
FIG. 7 is a side view of another embodiment of a coated abrasive article that employs the abrasive particle of this invention.

The triangular-shaped abrasive particles can be oriented so that the vertices of substantially all of the triangular-shaped abrasive particles point away from the backing. This embodiment is shown in FIG. 7. Referring to FIG. 7, coated abrasive article 50 comprises a backing 52 having a first layer of binder 54, hereinafter referred to as the make coat, applied over one major surface of backing 52. Partially embedded in make coat 54 are a plurality of abrasive particles 56. Over the abrasive particles 56 is a second layer of binder 58, hereinafter referred to as the size coat. The purpose of make coat 54 is to secure abrasive particles 56 to backing 52 and the purpose of size coat 58 is to reinforce abrasive particles 56. Some of the abrasive particles 56, generally no more than 20%, may be oriented in such a way that their vertices are not pointing away from the backing 52. Of course, the backing, the abrasive particles, the make coat, and the size coat can be made from the same materials that are useful for making the coated abrasive article of FIG. 3.

The following examples are illustrative of specific embodiments of this invention; however, these examples are for illustrative purposes only and are not to be construed as limitations upon the invention.

The following procedures were used for Examples 1–10.
Procedure for Making Shaped Abrasive Particles A dispersion (44% solids) was made by the following procedure: alpha aluminum oxide monohydrate powder (1,235 parts) having the trade designation "DISPERAL" and alpha iron oxide (206 parts, 10% FeOOH) were dispersed by continuous mixing in a solution containing water (3,026 parts) and 70% aqueous nitric acid (71 parts). The sol that resulted was mixed with magnesium nitrite (429 parts) to form a gel which was then dried at a temperature of approximately 125° C. in a continuous dryer to produce the 44% solids dispersion. The dispersion was introduced into the cavities of the desired shape in a mold by means of a rubber squeegee. The cavities contained a release coating, either a silicone material or polytetrafluoroethylene. The filled mold was placed in a forced air oven maintained at a temperature of 71° C. for 20 minutes. The dispersion underwent substantial shrinkage as it dried, and the dried precursors of the abrasive particles shrank in the cavities. The precursors of the abrasive particles were removed from the mold by gravity. After the precursors of the abrasive particles were removed from the mold, they were dried at a temperature of 121° C. for three hours.

The dried precursors of the abrasive particles were introduced into the end of a calciner, which can be described as a 23 cm diameter, 4.3 m long stainless steel tube having a 2.9 m hot zone, the tube being inclined at 2.4° with respect to the horizontal, and rotating at 6 rpm, providing residence time therein of about 15 minutes. The entry end temperature of the hot zone was 350° C. and the exit end temperature of the hot zone was 800° C. The material exiting the calciner was introduced into a kiln held at a temperature of about 1,390° C. The kiln was a 8.9 cm diameter, 1.32 m long silicon carbide tube inclined at 4.4° with respect to the horizontal, having a 76 cm hot zone, and rotating at 10.5 rpm, providing a residence time therein of about four minutes. The material exited the kiln into air at room temperature, where it was collected in a metal container and allowed to cool to room temperature.

Procedure for Making and Testing Coated Abrasive Articles

The abrasive particles of the examples described herein were utilized in coated abrasive articles made according to a conventional procedure for preparing coated abrasive articles. The abrasive particles were first screened to a screen size of 16–20 mesh U.S. Standard. A make coat was applied to a vulcanized fiber backing in the shape of a disc by means of a paint brush. The make coat consisted of conventional calcium carbonate-filled resole phenolic resin. The abrasive particles were projected into the make coat by means of a conventional electrostatic coating technique. A size coat consisting of conventional calcium carbonate-filled resole phenolic resin was applied over the abrasive particles and make coat by means of a paint brush. The concentration of calcium carbonate was 52% by weight and the concentration of resin was 48% by weight in the make coat and the size coat. The resin of the make coat was precured for 90 minutes at a temperature of 88° C. and the resin of the size coat was precured for 90 minutes at a temperature of 88° C. followed by a final cure of 10 hours at a temperature of 100° C. The approximate coating weights were 160 g/m² for the make coat, 905 g/m² for the layer of abrasive particles, and 987 g/m² for the size coat.

The cured coated abrasive articles, which were in the form of discs (having a diameter of 7 inches), were first flexed in a conventional manner to controllably fracture the hard bonding resins, then mounted on a beveled aluminum back-up pad, and used to grind the face of a 1.25 cm by 18 cm 1018 mild steel workpiece. The disc was driven at 5,000 rpm while the portion of the disc overlaying the beveled edge of the back-up pad contacted the workpiece at 6.81 kg load, generating a disc wear path of about 140 cm². Each disc was used to grind a separate workpiece for one minute each for a total time of 12 minutes for each disc or for sufficient one minute time intervals until no more than 5 g of metal were removed from the workpiece in any one minute time interval. The performance of the coated abrasive article is generally stated as a percent of Comparative Example A, that is, the total amount of metal removed from the workpiece by the coated abrasive article of Comparative Example A was set at 100% and the amount of metal removed by the coated abrasive article of the example was reported as a percent of that removed by the coated abrasive article of Comparative Example A. For example, a coated abrasive article made with abrasive particles according to one of the working examples that performed 10% better than the coated abrasive article of Comparative Example A has a performance of 110% of the article of Comparative Example A.

EXAMPLE 1

This example demonstrates the grinding performance of coated abrasive articles employing triangular-shaped abrasive particles prepared according to the Procedure for Making Shaped Abrasive Particles. The mold used to make the abrasive particles had cavities in the shape of an equilateral triangle, the length of each side of each cavity being 0.29 cm, and the depth of each cavity being 0.05 cm. The abrasive particles formed from this mold were triangular-shaped and had dimensions approximately 0.157 cm on each side and 0.028 cm thick (FIG. 1). The performance of coated abrasive articles employing the triangular-shaped abrasive particles was compared with coated abrasive articles employing equivalent screen sized (16–20 mesh U.S. Standard) randomly-shaped abrasive grains as described in Comparative Example A.

COMPARATIVE EXAMPLE A

The abrasive grains utilized in Comparative Example A were commercially available from Minnesota Mining and Manufacturing Company, St. Paul, Minn., under the trade designation of CUBITRON abrasive grain. CUBITRON abrasive grain comprises 93.5% alpha aluminum which was nucleated with 2% by weight of iron oxide and 4.5% magnesium oxide. The abrasive grain was employed in a coated abrasive article and tested as described above.

EXAMPLE 2

This example demonstrates the grinding performance of coated abrasive articles employing disc-shaped abrasive particles prepared according to the Procedure for Making Shaped Abrasive Particles. The disc-shaped abrasive particles were prepared by using a mold having cavities 0.23 cm in diameter and 0.05 cm deep (FIG. 6). The performance of the coated abrasive articles employing the disc-shaped abrasive particles was compared with coated abrasive articles employing the triangular-shaped abrasive particles of Example 1.

EXAMPLE 3

This example demonstrates the grinding performance of coated abrasive articles employing square-shaped abrasive particles. The abrasive particles were prepared according to the Procedure for Making Shaped Abrasive Particles. The square-shaped abrasive particles were prepared using a mold having cavities 0.23 cm on each side and 0.06 cm deep (FIG. 5). The performance of coated abrasive articles employing the square-shaped abrasive particles was compared with the coated abrasive articles employing the triangular-shaped abrasive particles of Example 1. Grinding performance of the foregoing examples is set forth in Table I.

TABLE I

| Example | Shape of grain | Total cut (% of Comparative Example A) |
| --- | --- | --- |
| Comparative A | Random | 100 |
| 1 | Triangular | 174 |
| 2 | Disc | 78 |
| 3 | Square | 114 |

The coated abrasive disc having the triangular-shaped abrasive particles showed 74% improvement in total cut, and the disc having the square-shaped abrasive particles showed 14% improvement in total cut over the disc having the randomly-shaped abrasive particles.

EXAMPLE 4

This example demonstrates the orientation of triangular-shaped abrasive particles when coated onto a fiber backing in an electrostatic field. Triangular-shaped abrasive particles were prepared as in Example 1. Fiber discs were prepared according to the Procedure for Testing and Making Coated Abrasive Articles.

The fiber discs bearing abrasive particles were observed under a low power microscope (10×) and the number of particles with a vertex pointing away from the backing and the number of particles with the base pointing away from the backing in the field were determined for four discs. Orientation of the particles is set forth in Table II.

TABLE II

| Disc | Percentage of particles having vertex pointing away from backing[1] | Percentage of particles having base pointing away from backing[1] |
| --- | --- | --- |
| I | 53% | 47% |
| II | 50% | 50% |
| III | 65% | 35% |
| IV | 55% | 45% |

[1]Less than 5% of the abrasive particles were oriented so that neither their vertices nor bases pointed away from the backing.

When the abrasive particles are coated in an electrostatic field, most of the particles orient so that a vertex point either toward or away from the backing and only a small percentage of particles lie flat. Moreover, the triangular-shaped abrasive particles orient such that approximately 50% have a vertex pointing away from the backing and approximately 50% have a base pointing away from the backing.

EXAMPLE 5

This example demonstrates the nature of the surface finish produced by coated abrasive articles employing triangular-shaped abrasive particles prepared as in Example 1. The coated abrasive articles of Comparative Examples B, C, and D employed randomly-shaped abrasive grains made by conventional methods. These grains were screened to ANSI grades 24, 36, and 50, respectively (ANSI Standard B74.18, 1984). The chemical composition of the abrasive grains of Comparative Examples B, C, D was the same as that of the abrasive particles of Example 1. The coated abrasive articles, i.e., discs, of Comparative Examples B, C, and D were made of the same material as described in Comparative Example A. The surface finish was determined by grinding the paint off a 15 cm×60 cm steel panel with a 6,000 rpm Black & Decker electric grinder. The surface finish of the steel was measured by using a Taylor-Hobson Surtronic 3 profile meter. The surface finish produced by the various discs is set forth in Table III. As used herein, "Ra" means the arithmetical mean deviation of the profile of the scratch; "Rtm" means the maximum peak-to-valley height of the profile of the scratch.

TABLE III

| Example | Ra (micrometers) | Rtm (micrometers) |
| --- | --- | --- |
| 5 | 4.1 | 25.1 |
| Comparative B | 7.8 | 41.9 |
| Comparative C | 6.9 | 37.2 |
| Comparative D | 4.5 | 25.6 |

The surface finish produced by the coated abrasive disc having triangular-shaped abrasive particles was superior to the finish produced by the discs of the Comparative Examples B and C. The finish produced by the triangular-shaped abrasive grains was essentially the same as that produced by the disc of Comparative Example D.

EXAMPLE 6

This example demonstrates grinding performance of coated abrasive articles employing triangular-shaped abrasive particles prepared as in Example 1.

The discs were tested according to the Procedure for Testing and Making Coated Abrasive Articles, except that the test was extended by one-minute intervals to the point at which each disc removed the same amount of metal in the final one-minute interval. The discs were compared with those of Comparative Example A. The results are set forth in Table IV.

TABLE IV

| Example | Duration to reach end point (min) | Amount of metal removed by end point (g) |
| --- | --- | --- |
| 6 | 26 | 2515 |
| Comparative A | 12 | 1033 |

This example demonstrates that a disc having triangular-shaped abrasive grains has a longer life than does a disc employing conventional "CUBITRON" grains. The disc of this invention removed 143% more metal before reaching the equivalent end point.

EXAMPLE 7

This example demonstrates the grinding performance of coated abrasive articles employing blends of triangular-shaped abrasive particles of this invention and diluent grains, such as marble. The triangular-shaped abrasive particles were prepared according to the Procedure for Making Shaped Abrasive Particles. The mold used to make the abrasive particles had cavities 0.190 cm on each side and 0.03 cm deep. The particles made with this mold were triangular-shaped and equivalent in size to 25–30 mesh U.S. Standard screen. The triangular-shaped abrasive particles were blended with ANSI 36 marble on an equal weight basis. The abrasive particle/marble blend was coated at a weight of 820 g/m². The weight of the make coat was 160 g/m². The weight of the size coat was 655 g/m². The abrasive grains in Comparative Example E (ANSI 36) was prepared as described in Comparative Example A. The discs were tested as in Procedure for Testing Coated Abrasive Articles. The results are set forth in Table V.

TABLE V

| Example | Total cut (% of Comparative Example E) |
| --- | --- |
| Comparative E | 100 |
| 7 | 114 |

This example demonstrates that a disc having a blend of triangular-shaped abrasive grains and marble showed 14% improvement in total cut over a disc having conventional sol-gel abrasive grains of random shape.

EXAMPLE 8

This example demonstrates the grinding performance of triangular-shaped abrasive particles at high grinding pressures. The samples were prepared and tested in the same manner as was used in Example 1, except that the test load applied to the rotating disc was increased to 8.6 kg. The abrasive grains in Comparative Example F were prepared as was described in Comparative Example A. The disc in Comparative Example F used ANSI 24 "CUBITRON" randomly-shaped abrasive grains. The results are set forth in Table VI.

TABLE VI

| Example | Total cut (% of Comparative Example F) |
| --- | --- |
| Comparative F | 100 |
| 8 | 143 |

This example demonstrates that a disc having triangular-shaped abrasive particles showed improved grinding performance over a disc having randomly-shaped abrasive grains at high grinding pressures.

EXAMPLE 9

This example demonstrates the grinding performance of triangular-shaped abrasive particles. The triangular-shaped abrasive particles were prepared and tested in the same manner as was used in Example 1, with the exception that magnesium nitrite was not added to the sol. The abrasive grains in Comparative Example G were prepared according to U.S. Pat. No. 4,964,883. The abrasive grains contained 98% by weight alpha alumina and 2% by weight iron oxide nucleating a gent. The disc in Comparative Example G used ANSI 36 "CUBITRON" randomly-shaped abrasive grains. The results are set forth in Table VII.

TABLE VII

| Example | Total cut (% of Comparative Example G) |
| --- | --- |
| Comparative G | 100 |
| 9 | 136 |

This example demonstrates that a disc having triangular-shaped abrasive particles that were free of magnesium oxide showed superior grinding performance to that of a disc having randomly-shaped abrasive grains.

EXAMPLE 10

This example demonstrates the grinding performance of triangular-shaped abrasive particles blended with erodable agglomerates. The triangular-shaped abrasive particles were prepared in the same manner as was used in Example 1. The erodable agglomerates were prepared according to U.S. Pat. No. 5,078,753, Example 1. The erodable agglomerates used in this example were capable of passing through a 16 mesh screen and being retained on a 30 mesh screen. The triangular-shaped abrasive particles and the erodable agglomerates were blended. Discs were prepared and tested in the manner described in Procedure For Making and Testing Coated Abrasive Articles. The coating weight of the triangular-shaped abrasive particles was 614 g/m². The coating weight of the erodable agglomerates was 205 g/m². The coating weight of the make coat was 160 g/m². The coating weight of the size coat was 1065 g/m². The abrasive grain in Comparative Example H was prepared in the same manner as was described in Comparative Example A. The results are set forth in Table VIII.

TABLE VIII

| Example | Total cut (% of Comparative Example H) |
| --- | --- |
| Comparative H | 100 |
| 10 | 130 |

This example demonstrates that open coat constructions providing good performance can be made with triangular-shaped abrasive particles. The erodable agglomerates support the triangular-shaped abrasive particles and provide good orientation for the triangular-shaped abrasive particles.

EXAMPLE 11

In this example, precursors of abrasive particles were prepared by means of the apparatus shown in FIG. 8. The dispersion for this example was prepared under the same conditions as were described in Procedures for Making Shaped Abrasive Particles. One lot of triangular-shaped abrasive grains was prepared without the wiping technique, and another lot was prepared with the wiping technique. The abrasive grains in Comparative Example J were prepared in the same manner as was described in Comparative Example A. Discs were prepared and tested in the manner described in Procedure for Making and Testing Coated Abrasive Articles. The results are set forth in Table IX.

TABLE XI

| Example | Total cut (% of Comparative Example J) |
| --- | --- |
| Comparative J | 100 |
| 11 (without wiping) | 119 |
| 11 (with wiping) | 140 |

This example demonstrates that wiping of the filled web is beneficial to the grinding performance of discs employing triangular-shaped abrasive particles.

Various modifications and alterations of this invention will become apparent to those skilled in the art without departing from the scope and spirit of this invention, and it should be understood that this invention is not to be unduly limited to the illustrated embodiments set forth herein.

What is claimed is:

1. Method for preparing an abrasive particle suitable for use as an abrasive grit in an abrasive article, said method comprising the steps of:

(a) providing a dispersion containing particles that can be converted into alpha alumina in a liquid, which liquid comprises a volatile component;

(b) providing a mold having a first surface and a second surface opposed to said first surface, said first surface having an opening to a mold cavity having a specified shape;

(c) introducing said dispersion into said mold cavity;

(d) removing a sufficient portion of said volatile component of said liquid from said dispersion while said dispersion is in said mold cavity to form a precursor of an abrasive particle having a shape approximately corresponding to the shape of said mold cavity;

(e) removing said precursor of said abrasive particle from said mold;

(f) calcining said removed precursor of said abrasive particle; and (g) sintering said calcined precursor of said abrasive particle to form said abrasive particle.

2. The method of claim 1, further comprising the step of gelling said dispersion prior to introducing said dispersion into said mold cavity.

3. The method of claim 1, wherein said dispersion is introduced into said mold cavity under a pressure of less than 100 psi.

4. The method of claim 1, wherein said first surface of said mold is exposed to the atmosphere surrounding said mold at least during step (d).

5. The method of claim 1, wherein step (d) is conducted under ambient temperature and pressure conditions.

6. The method of claim 1, wherein step (d) is accomplished by evaporation.

7. The method of claim 1, further comprising the step of drying said precursor of said abrasive particle after it is removed from said mold and before said precursor of said abrasive particle is calcined.

8. The method of claim 1, wherein said mold contains a plurality of cavities having specified shapes.

9. The method of claim 8, wherein said mold contains at least 20 cavities.

10. The method of claim 1, wherein said particles that can be converted into alpha alumina comprise alpha aluminum oxide monohydrate.

11. The method of claim 1, wherein said dispersion further contains a modifying additive or precursor of a modifying additive.

12. The method of claim 11, wherein said modifying additive or precursor of a modifying additive is a soluble salt.

13. The method of claim 1, wherein said dispersion further contains a nucleating agent.

14. The method of claim 13, wherein said nucleating agent includes fine particles selected from the group consisting of alpha alumina, alpha ferric oxide, precursor of alpha ferric oxide, chrome oxides, titanium oxide, and titanates.

15. The method of claim 1 wherein said mold cavity extends completely through said mold, whereby said second surface has an opening to said mold cavity.

16. An abrasive particle prepared according to the method of claim 1.

17. The abrasive particle of claim 16, wherein said particle has a front face and a back face, said front face having substantially the same geometric shape as said back face, said faces being separated by the thickness of said particle, wherein the ratio of the length of the shortest facial dimension to the thickness of said particle is at least 1:1.

18. The abrasive particle of claim 17, wherein said front face and said back face each have three sides.

19. The abrasive particle of claim 16, wherein said particle has a front face and a back face, said front face having substantially the same geometric shape as said back face, said faces being separated by the thickness of said particle, wherein the ratio of the length of the shortest facial dimension to the thickness of said particle is at least 2:1.

* * * * *